United States Patent [19]

Fukino

[11] Patent Number: 5,532,883
[45] Date of Patent: Jul. 2, 1996

[54] LENS BARREL HAVING SUPPRESSED LOAD TORQUE AND MOMENT OF INERTIA

[75] Inventor: Kunihiro Fukino, Fujisawa, Japan

[73] Assignee: Nikon Corporation, Japan

[21] Appl. No.: 426,181

[22] Filed: Apr. 21, 1995

[30] Foreign Application Priority Data

Jun. 22, 1994 [JP] Japan .................................. 6-163031

[51] Int. Cl.[6] .............................. G02B 7/02; G02B 15/14
[52] U.S. Cl. ........................ 359/825; 359/694; 359/696; 359/699
[58] Field of Search .................................. 359/694, 700, 359/823, 704, 825, 696, 697, 698, 699

[56] References Cited

U.S. PATENT DOCUMENTS

| | | | |
|---|---|---|---|
| 4,796,045 | 1/1989 | Hamanashi | 354/400 |
| 4,963,000 | 10/1990 | Kawai | 359/824 |
| 4,964,697 | 10/1990 | Fuziwara | 359/700 |
| 5,144,493 | 9/1992 | Nomura | 359/693 |
| 5,239,415 | 8/1993 | Imanari | 359/694 |
| 5,264,966 | 11/1993 | Okada | 359/696 |

Primary Examiner—Georgia Y. Epps
Assistant Examiner—Ricky Mack

[57] ABSTRACT

A lens barrel having a focusing optical system, a rotatable moving member for moving the focusing optical system for the focusing operation, an rotatable operating mechanism for driving the moving member for focusing, a biasing member for giving a friction torque to the rotation of the operating mechanism, a driving member secured to the operating mechanism for rotating the moving member, a connecting device secured to the operating mechanism for connecting and non-connecting the operating mechanism with the moving member, and a detecting device for detecting the rotation of the operating mechanism. Auto focusing is possible when the connecting device is in its non-connecting state and the focusing optical system is driven by the driving member through the moving member. When during the auto focusing operation the rotation of the operating mechanism is detected by the detecting device, the autofocusing operation is immediately stopped and the operating mechanism is connected to the moving member by the connecting device to perform manual focusing of the optical system by the operating mechanism through the moving member.

6 Claims, 3 Drawing Sheets

LENS BARREL HAVING SUPPRESSED LOAD TORQUE AND MOMENT OF INERTIA

BACKGROUND OF THE INVENTION

1. Field of the Invention

This invention relates to a lens barrel, and particularly to a lens barrel which has the auto focusing mode and the manual focusing mode and in the changeover between the two focusing modes may be effected very quickly and easily to thereby improve operability and the responsiveness of the focusing operation in the auto focusing mode is improved.

2. Related Background Art

Recently, almost all of camera systems such as still cameras or video cameras have the auto focusing function and the manual focusing function, and are designed such that a photographer can selectively use the auto focusing (hereinafter simply referred to as AF) mode and the manual focusing (hereinafter simply referred to as MF) mode by changeover as required. In the lens barrel of such a camera in which the AF mode and the MF mode can be changed over, design is made such that during the AF mode, a lens is driven by a motor or the like and during the MF mode, the motor is stopped and a manually operated ring such as a distance ring is manually turned to thereby axially move the lens. Also, as a changeover mechanism for the AF mode and the MF mode, a clutch mechanism is provided in a driving system for a focusing lens and when changeover is to be done from the AF mode to the MF mode, a driving system for AF may be interrupted by this clutch mechanism and the operatively associated member of the focusing lens may be directly manually operated to drive the focusing lens.

As a lens barrel of this type, there is proposed one described in Japanese Patent Application Laid-Open No. 4-218006. In this lens barrel, which has a focusing optical system, a holding cylinder for holding the focusing optical system and moving it in the direction of the optical axis thereof to thereby effect focusing, a cam cylinder rotatable about the optical axis and moving the holding cylinder by said rotation, manually operated means rotatable by a manual operation and rotating the cam cylinder by said rotation, AF driving means, automatically operated means driven by the AF driving means and rotating the cam cylinder by said driving, and clutch means displaceable to a first position and a second position, and when in the first position, connecting the cam cylinder and the manually operated means together, and when in the second position, connecting the cam cylinder and the automatically operated means together, a motor is used as a drive force source for driving a device for effecting the changeover between an AF device and an MF device. When a photographer gives a predetermined electrical signal from outside for the purpose of changeover, the electrical signal is transmitted to the motor, which is thus rotated, whereby the changeover from the AF device to the MF device or from the MF device to the AF device is effected depending on the forward or reverse direction of the rotation of the motor. Thereby, it is made possible to effect the changeover quickly by small consumption of electric power.

However, in the lens barrel proposed in the aforementioned Japanese Patent Application Laid-Open No. 4-218006, the whole or a part of the changeover mechanism for the AF mode and the MF mode is carried out on a cam cylinder and therefore, the load torque and moment of inertia during AF servo driving become great. This has sometimes given rise to the problem that the converging time of AF servo becomes long and the performance of the foreseen driving of a moving object becomes bad or servo accuracy is aggravated to reduce the in-focus accuracy during photographing with a result that focusing becomes bad.

SUMMARY OF THE INVENTION

It is the object of the present invention to provide, in view of the above-noted problem peculiar to the lens barrel according to the prior art, a lens barrel in which the load torque and moment of inertia during AF servo driving are made as small as possible to thereby improve the response characteristic of AF servo, whereby the converging time for AF servo can be shortened to improve the performance of the foreseen driving of a moving object and enhance servo accuracy and further improve the focusing performance during photographing.

In order to achieve the above object, a lens barrel according to the present invention is provided with a focusing optical system movable in the direction of the optical axis thereof to perform the focusing operation, a moving member rotatable about the optical axis and moving said focusing optical system in the direction of the optical axis by the rotation of said moving member; an operating mechanism rotatively operable about the optical axis for driving said moving member by the focusing operation, a biasing member for giving a friction torque to the rotation of said operating mechanism, a driving member secured to said operating mechanism for rotatively driving said moving member, a connecting device secured to said operating mechanism for setting the connected and non-connected states of said operating mechanism and said moving member, and a detecting device for detecting the rotation of said operating mechanism, and is characterized in that said connecting device is brought into its non-connecting state and said focusing optical system is driven by said driving member through said moving member for making the auto focusing operation possible, and when during the auto focusing operation, the rotation of said operating mechanism is detected by said detecting device, the auto focusing operation is immediately stopped and said operating mechanism and said moving member are connected together by said connecting device, thereby enabling the manual focusing operation of driving said focusing optical system by said operating mechanism through said moving member.

Also, design can be made such that immediately or in a predetermined time after it is detected by said detecting device that the rotation of said operating mechanism has been stopped, said connecting device is brought into its non-connecting state and the auto focusing operation can be performed again.

Further, it will be convenient if design is made such that when a friction torque created in said operating mechanism by said biasing member is X and a torque required for the driving of said moving member is Y, the condition that X>Y is satisfied.

Furthermore, it will be convenient if said connecting device includes a clutch mechanism for rendering said operating mechanism and said moving member mechanically coupled and non-coupled.

In the lens barrel constructed as described above, said connecting device is brought into its non-connecting state to thereby drive said focusing optical system by said driving member through said moving member, whereby the auto focusing operation is possible. When during the auto focusing operation, the rotation of said operating mechanism is detected by said detecting device, the auto focusing operation is immediately stopped and said connecting device is brought into its connecting state and said operating mechanism and said moving member are connected together. Thereby, it becomes possible to perform the manual focusing operation of operatively driving the focusing optical system by said operating mechanism through said moving member.

In the lens barrel as described above, said driving member and said connecting device are carried on said operating mechanism, and are not carried on the moving member as in the lens barrel according to the prior art and therefore, no excess load body is on the moving member and the weight of this moving member is reduced. Accordingly, the load torque and moment of inertia during AF servo driving are suppressed to the necessary minimum, and the responsiveness of AF servo is improved and it becomes possible to perform a quick and highly accurate AF operation.

Also, there is realized a conveniently usable lens barrel in which when it is detected by said detecting device that the rotation of said operating mechanism has been stopped, said connecting device is brought into its non-connecting state immediately or a predetermined time after to make the auto focusing operation possible, whereby the mode is again automatically changed over to the auto focusing mode without any excess operation being required.

Further, when a friction torque created in the operating mechanism by said biasing member is X and a torque required for the driving of said moving member is Y, if the condition that X>Y is satisfied, it will never happen that when during the auto focusing operation, said moving member is driven by said driving member, said operating mechanism is inadvertently driven, and a stable AF operation will be performed.

DESCRIPTION OF THE PREFERRED EMBODIMENT

Figure 1:
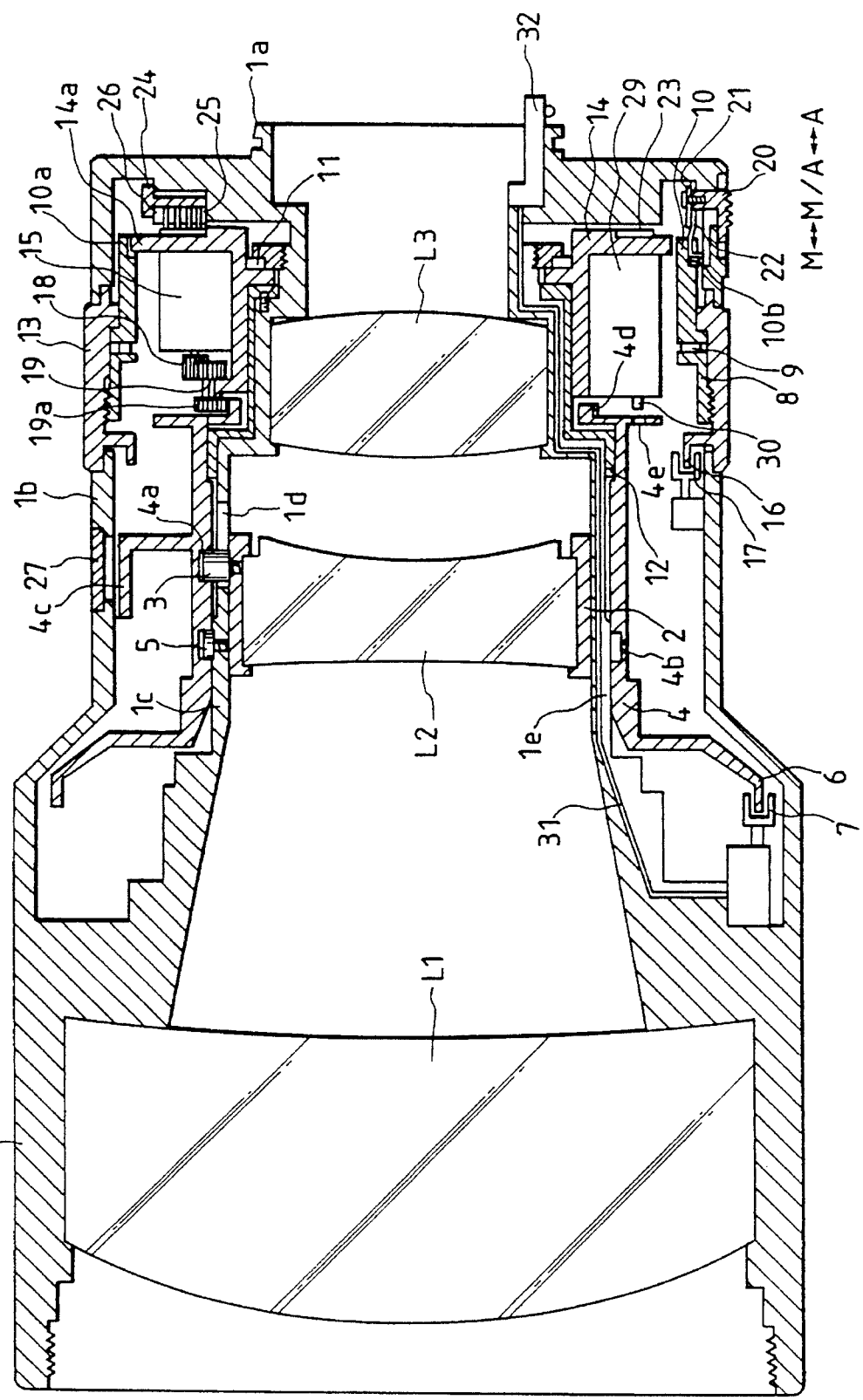
FIG. 1 is a diagram of a longitudinal cross-sectional view showing the construction of a lens barrel according to a preferred embodiment of the present invention.
Figure 2:
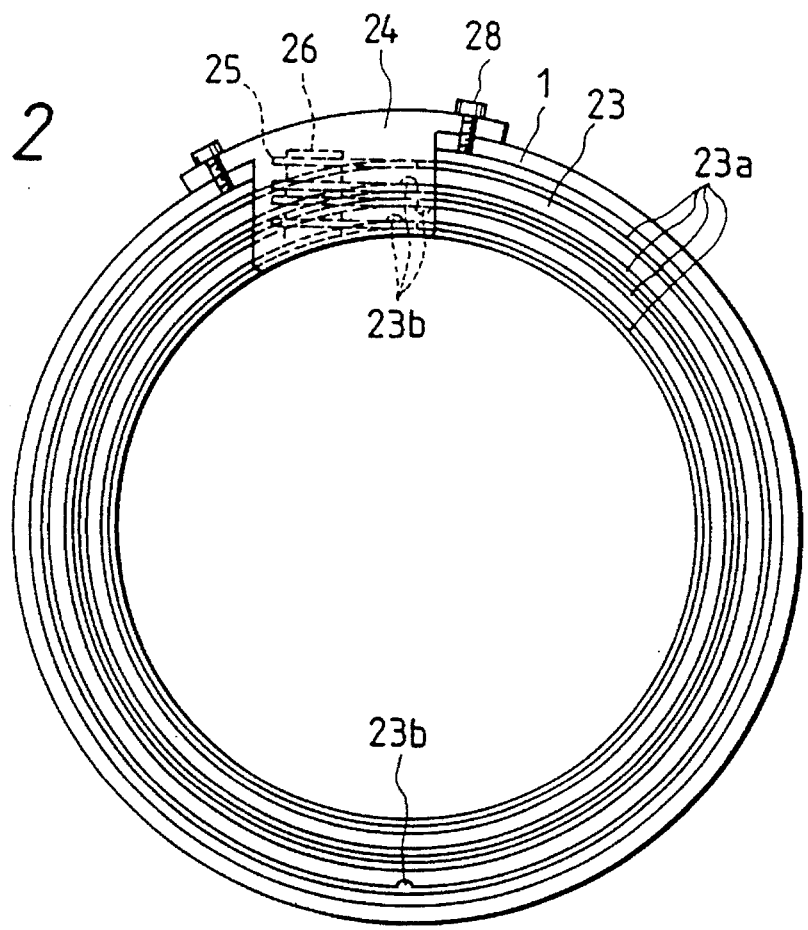
FIG. 2 is a diagram of a transverse cross-sectional view showing the details of a power source supply portion to a motor in the lens barrel of FIG. 1.
Figure 3:
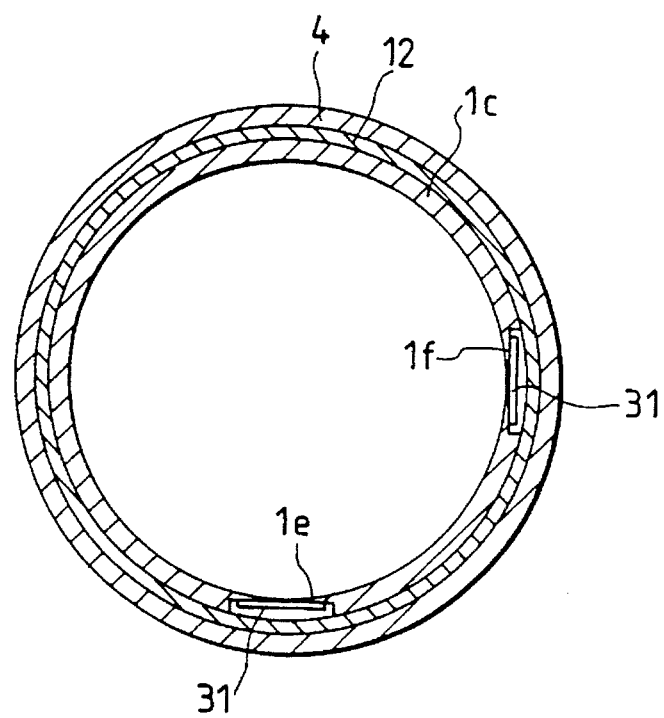
FIG. 3 is a diagram of a transverse cross-sectional view showing the details of the inner cylinder portion of a fixed cylinder in the lens barrel of FIG. 1.

A preferred embodiment of the present invention will hereinafter be described with reference to the drawings. FIG. 1 is a diagram of a longitudinal cross-sectional view of a lens barrel according to a preferred embodiment of the present invention, and FIG. 2 is a diagram of a transverse cross-sectional view showing the details of a power source supply portion for supplying a power source to a motor used in the lens barrel of FIG. 1. Further, FIG. 3 is a diagram of a transverse cross-sectional view showing the inner cylinder portion of a fixed cylinder in the lens barrel of FIG. 1.

The lens barrel shown in these figures has a fixed barrel 1 having a bayonet pawl 1a for mounting the lens barrel on a camera body. The fixed barrel 1 is comprised of an outer cylinder portion 1b and an inner cylinder portion 1c, and on the inner periphery of the inner cylinder portion 1c, there are fixedly held image pickup optical systems L1 and L3 and is slidably disposed a lens holding cylinder 2 for holding a focusing optical system L2.

The lens holding cylinder 2 is provided with a pin 3 which is fitted in a rectilinear movement guide groove 1d formed in the inner cylinder portion 1c and a lead groove 4a formed in a cam cylinder 4 fitted on the outer periphery of the inner cylinder portion 1c for rotation through a predetermined angle, and by the cam cylinder 4 being rotated, the focusing optical system L2 is moved in the direction of the optical axis thereof, whereby the focusing operation is performed.

The cam cylinder 4 has its movement in the direction of the optical axis regulated by a circumferential groove 4b formed in the cam cylinder 4 and a pin 5 fitted in this circumferential groove 4b and provided on the inner cylinder portion 1c of the fixed barrel 1 and also has its rotation about the optical axis limited within a predetermined rotation angle range.

Also, the pattern portion 6 of an encoder is provided on the front side of the cam cylinder 4. A detecting portion 7 for detecting the pattern of this pattern portion 6 of the encoder is provided in the inner cylinder portion 1c so as to transmit signals indicative the amount and direction of rotation of the cam cylinder 4, i.e., signals indicative of the amount and direction of movement of the focusing optical system L2, to a CPU (corresponding to 110 in FIG. 4 which will be described later) in an interchangeable lens, not shown. Such signals indicative of the amount and direction of rotation of the cam cylinder 4 are used for AF control.

Also, a distance scale portion 4c is provided over the outer peripheral portion of the cam cylinder 4, and a gear portion 4d and a hole portion 4e are provided on the rear end portion of the cam cylinder 4 over the entire circumference thereof.

A fixed barrel cover 12 is secured to the outer periphery of the inner cylinder portion 1c of the fixed barrel 1 so as to cover groove portions 1e and 1f formed on the outer periphery of the inner cylinder portion 1c (FIG. 3). The fixed barrel cover 12 extends from a rotatable cylinder 14 to a portion of the cam cylinder 4.

Further, an extraneously operable manually operated ring 13 is rotatably fitted to the outer cylinder portion 1b of the fixed barrel 1.

The manually operated ring 13 is provided with a pattern portion 16 as rotation detecting means, and a signal conforming to the rotation of the manually operated ring 13 is detected by a detecting portion 17 fixed to the fixed barrel 1 and is transmitted to a CPU, not shown, in the lens barrel.

The rotatable cylinder 14 is rotatably fitted on the outer periphery of the fixed barrel cover 12, and an engagement projection 14a is provided on the outer peripheral portion of the rotatable cylinder 14. The fixed barrel cover 12 is also rotatably fitted on a portion of the cam cylinder 4.

The engagement projection 14a is engaged with an engagement groove 10a in an intermediate cylinder 10 rotatably interlocked to a keep ring 8 threadably coupled to the manually operated ring 13, through a biasing member 9. Accordingly, the intermediate cylinder 10 and the rotatable cylinder 14 rotate as a unit.

A biasing member 11 is for giving a predetermined friction torque to the rotatable cylinder 14 so that the rotatable cylinder 14 may not rotate during the MF priority AF mode which will be described later.

A motor 15 is secured to the outer periphery of the rotatable cylinder 14, and a gear 18 is secured to the shaft portion of the motor 19.

A reduction gear 19 is supported on the outer periphery of the rotatable cylinder 14, and a pinion portion 19a is in meshing engagement with the gear portion 4d of the cam cylinder 4.

Further, a clutch 29 is secured to the outer periphery of the rotatable cylinder 14.

The clutch 29 is comprised of a drive motor, a reduction gear train, a slide lever (all being not shown), an interlocking pin 30, etc., and the interlocking pin 30 is moved back and forth in the direction of the optical axis by the operation of the drive motor, and comes into engagement with the hole portion 4e of the cam cylinder 4 when it is positioned forwardly. At this time, the intermediate cylinder 10, the manually operated ring 13, the cam cylinder 4 and the rotatable cylinder 14 become a unit in the direction of rotation.

A glass epoxy plate 23 is secured to the right end portion of the rotatable cylinder 14, and as shown in FIG. 2, a plurality of conductive portions 23a are provided in a ring-like fashion over the entire periphery of the glass epoxy plate 23. A brush 25 is designed to contact with and slide on each of the conductive portions 23a. Accordingly, in whatever angular position may be the rotatable cylinder 14, electrical connection with the motor 15 is possible. Throughholes 23b are formed in portions of the ring-like pattern of the conductive portions 23a, and a conducting portion leads to the back of the glass epoxy plate 23 and electrical connection is accomplished from that back to the motor 15 by a lead wire or the like, not shown. The reference numeral 26 designates a keep plate for fixing the brush 25 to a brush fixing plate 24, which in turn is fixed to the fixed barrel 1 by small screws 28.

Turning back to FIG. 1, it will be seen that a mode changeover switch 20 is slidably provided on the outer peripheral portion 1b of the fixed barrel 1. This mode changeover switch 20 is such that the right end A in FIG. 1 is a position for the AF mode, the intermediate M/A is a position for the MF priority AF mode and the left end M is a position for the MF mode, and is designed to produce predetermined electrical signals in conformity with the respective positions and modes. In FIG. 1, the position of the mode changeover switch 20 is in the state of the AF mode. In this state, a leaf spring 22 fixed to the fixed barrel 1 is in engagement with groove portions 10b provided at a plurality of locations on the outer periphery of the intermediate cylinder 10 and therefore, the rotation of the rotatable cylinder 14 and intermediate cylinder 10 is hindered. In contrast, when the mode changeover switch 20 is slidden to the position M/A or M, a changeover plate 21 fixed to the switch 20 by screws is also moved at the same time to thereby raise and disengage the leaf spring 22 fixed to the fixed barrel 1 from the groove portions 10b. Accordingly, the rotation of the rotatable cylinder 14 and intermediate cylinder 10 becomes possible.

Figure 4:
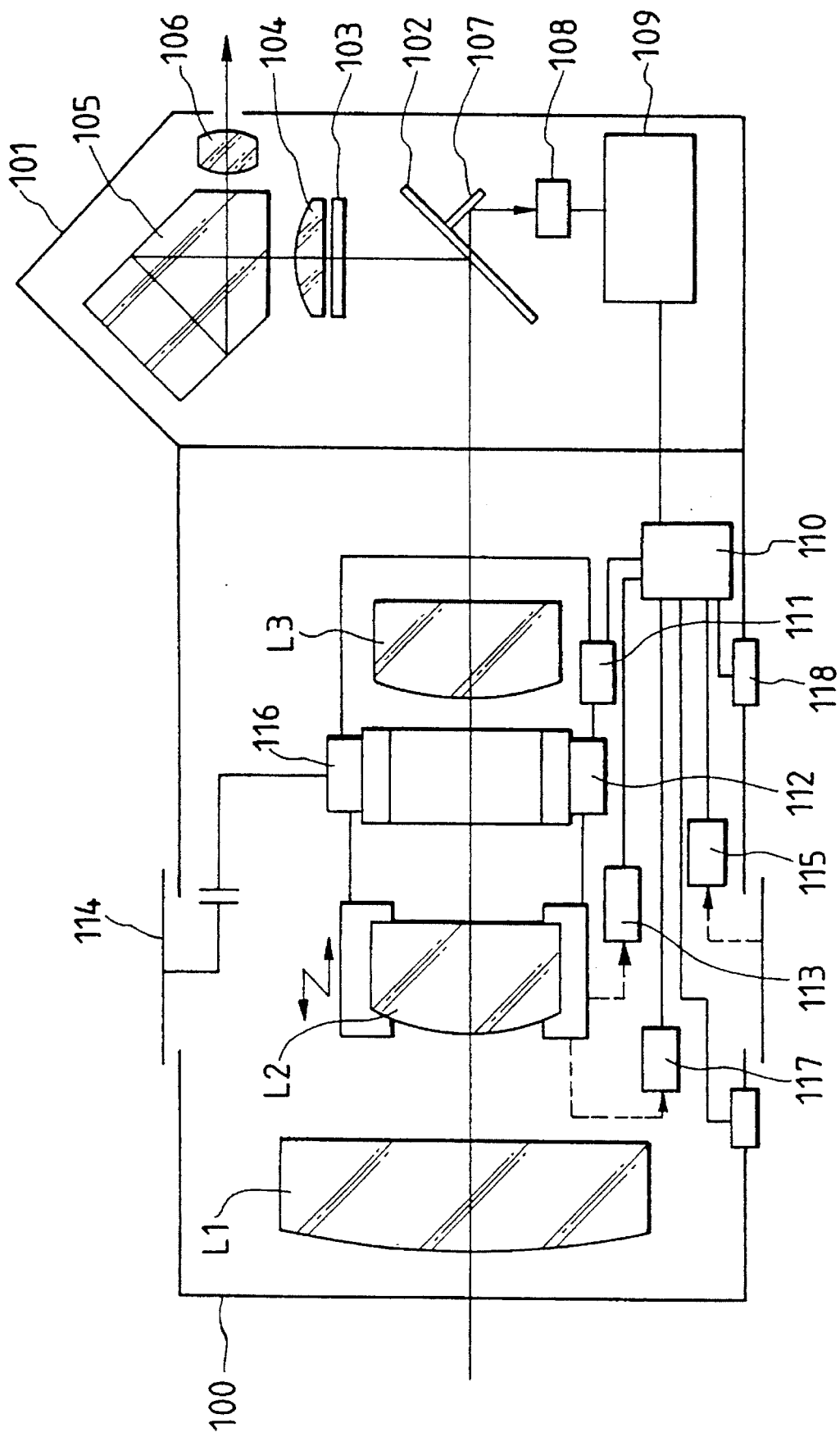
FIG. 4 is a schematic block diagram showing the general construction of a camera system including the lens barrel of FIG. 1.

Design is made such that when the lens barrel is set to the AF mode and the MF priority AF mode, the supply of the power source to the motor 15 and clutch 29 and the control of the driving thereof can be done by a control device (not shown in FIG. 1, but see description of FIG. 4). Also, when the lens barrel is set to the MF mode, the supply of the power source to the clutch 29 and the control of the driving thereof are done by the control device (not shown in FIG. 1, but see description of FIG. 4), but the supply of the power source to the motor 15 and the driving thereof are not done.

A window member 27 provided on the outer peripheral portion 1b of the fixed barrel 1 is formed of transparent synthetic resin, and through it, the distance scale portion 4c of the cam cylinder 4 can be seen from the outside of the lens barrel.

When a friction torque created between the fixed barrel 1 and the rotatable cylinder 14 by the biasing member 11 is A and a torque required for the driving of the lens holding cylinder 2, i.e., a torque necessary to rotate the cam cylinder 4, is B and a friction torque created between the intermediate cylinder 10 and the manually operated ring 13 by the biasing member 9 is C, the setting and construction of each portion are done such that the conditions that A>B and A+B<C are satisfied.

The reference numeral 31 designates a flexible printed wiring plate provided to effect the supply of the power source to the motor 15, the clutch 29, the detecting portions 7 and 17 of the encoder, etc. and the giving and receiving of signals among them and the CPU in the lens and the connector 32 on the rear end portion of the fixed barrel 1. The flexible printed wiring plate 31 is disposed in groove portions 1e and if provided on the outer periphery of the inner peripheral portion 1c of the fixed barrel 1. As previously described, the fixed barrel cover 12 is provided over the groove portions 1e and 1f to prevent the floating-up of the flexible printed wiring plate 31.

Description will now be made of the operation of the lens barrel having the construction as described above.

During the AF mode, the mode changeover switch 20 is in the position A and the leaf spring 22 is in engagement with the groove portion 10b of the intermediate cylinder 10 and therefore, the rotation of the intermediate cylinder 10 and rotatable cylinder 14 is hindered. Accordingly, when a driving power source produced on the basis of distance measurement information is supplied to the motor 15 by the control device, not shown, the motor 15 is rotated and the cam cylinder 4 is rotated in the circumferential direction through the gear 18 and reduction gear 19. When the cam cylinder 4 is rotated, the lens holding cylinder 2 is moved along the optical axis, whereby the AF operation is performed. At this time, the interlocking pin 30 of the clutch 29 is positioned rearwardly, i.e., at the right-hand side as viewed in FIG. 1, and is out of engagement with the hole portion 4e of the cam cylinder 4.

During the MF mode, the mode changeover switch 20 is slidden to the position M of FIG. 1. Thereby, the supply of the power source to the motor 15 is cut off. When the mode changeover switch 20 is slidden toward the position M of FIG. 1, the changeover plate 21 fixed to the switch 20 by small screws is also moved at the same time to thereby raise the leaf spring 22 fixed to the fixed barrel 1 and bring the leaf spring 22 out of engagement with the groove portion 10b. Thus, the intermediate cylinder 10 and rotatable cylinder 14 become rotatable. At the same time, the clutch 29 is operated by the control device, not shown, and the interlocking pin 30 is moved forwardly, i.e., leftwardly as viewed in FIG. 1, and comes into engagement with the hole portion 4e of the cam cylinder 4. Accordingly, the intermediate cylinder 10, the manually operated ring 13, the cam cylinder 4 and the rotatable cylinder 14 become a unit in the direction of rotation. Also, when the friction torque created between the fixed barrel 1 and the rotatable cylinder 14 by the biasing member 11 is A and the torque required for the driving of the lens holding cylinder 2, i.e., the torque necessary to rotate the cam cylinder 4, is B and the friction torque created between the intermediate cylinder 10 and the manually operated ring 13 by the biasing member 9 is C, the condition that A+B<C is satisfied as previously described. Accordingly, when the manually operated ring 13 is rotated, the cam cylinder 4 is rotated through the intermediary of the intermediate cylinder 10, the rotatable cylinder 14 and the clutch 29, and the lens holding cylinder 2 is moved along the optical axis, whereby the MF operation is performed.

The cam cylinder 4, as previously described, has its rotation limited to a predetermined angle range by the pin 5, but when the cam cylinder 4 is rotated to a position in which it is subjected to such rotational limitation, if an attempt is made to further rotate the manually operated ring 13 in the rotation limiting direction, the manually operated ring 13 will be idly rotated by the work of the biasing member 9. By such a construction, when the cam cylinder 4 is brought into an unrotatable state by the rotational limitation, even if the manually operated ring 13 is further rotated in the rotation limiting direction, no excessively great load will be applied to the rotatable cylinder 14, the clutch 29, the cam cylinder 4, etc.

During the MF priority AF mode, the mode changeover switch 20 is set in the position M/A of FIG. 1. Assuming that the mode changeover switch 20 has been slidden, for example, from the position A of FIG. 1 to the position M/A, the changeover plate 21 fixed to this switch 20 by small screws is also moved at the same time to raise the leaf spring 22 fixed to the fixed barrel 1 and bring the leaf spring 22 out of engagement with the groove portion 10b. Thereby, if the intermediate cylinder 10 and rotatable cylinder 14 are rotatable and moreover the driving power source is supplied to the motor 15 by the control device, not shown, the motor 15 becomes rotatable. When as previously described, the friction torque created between the fixed barrel 1 and the rotatable cylinder 14 by the biasing member 11 is A and the torque required for the driving of the lens holding cylinder 2, i.e., the torque necessary to rotate the cam cylinder 4, is B, the condition that A>B is satisfied. Accordingly, when the driving power source is supplied to the motor 15 by the control device, not shown, the cam cylinder 4 is rotated in the circumferential direction through the intermediary of the gear 18 and reduction gear 19 of the motor 15. When the cam cylinder 4 is rotated, the lens holding cylinder 2 is moved along the optical axis, whereby the AF operation is performed. At this time, the interlocking pin 30 of the clutch 29 is positioned rearwardly, i.e., at the right-hand side as viewed in FIG. 1 and is out of engagement with the hole portion 4e of the cam cylinder 4. When the manually operated ring 13 is then rotated during the AF operation in such MF priority AF mode, the rotation signal of the manually operated ring 13 is detected by the pattern portion 16 of the rotation detecting means and the detecting portion 17 fixed to the fixed barrel 1, and the supply of the power source to the motor 15 is cut off by the control device, not shown, and also the clutch 29 is operated by the control device, not shown, and the interlocking pin 30 is moved forwardly, i.e., leftwardly as viewed in FIG. 1, and comes into engagement with the hole portion 4e of the cam cylinder 4. Accordingly, the intermediate cylinder 10, the manually operated ring 13, the cam cylinder 4 and the rotatable cylinder 14 become a unit in the direction of rotation. Also, when the friction torque created between the fixed barrel 1 and the rotatable cylinder 14 by the biasing member 11 is A and the torque required for the driving of the lens holding cylinder 2, i.e., the torque necessary to rotate the cam cylinder 4, is B and the friction torque created between the intermediate cylinder 10 and the manually operated ring 13 by the biasing member 9 is C, the condition that A+B<C is satisfied as previously described. Accordingly, when the manually operated ring 13 is rotated, the cam cylinder 4 is rotated through the intermediary of the intermediate cylinder 10, the rotatable cylinder 14 and the clutch 29, and the lens holding cylinder 2 is moved along the optical axis, whereby the MF operation is performed.

In the present embodiment, the intermediate cylinder 10 and the rotatable cylinder 14 are discrete members for the convenience of construction, but these two are in a predetermined relation as to their position in the direction of the optical axis and are rotated together and therefore can also be constructed of a single common member.

Also, the biasing member 9 is provided so that even if the manually operated ring 13 is further rotated in the rotation limiting direction with the cam cylinder 4 having its rotation limited by the pin 5 as previously described, no excessively great load may be applied to the rotatable cylinder 14, the clutch 29, the cam cylinder 4, etc. However, the biasing member 9 may be eliminated if such mechanical strength that a loard may be applied is ensured in each portion. In such case, the intermediate cylinder 10 and the manually operated ring 13 can be provided by a single member and the keep ring 8 can be eliminated, and this means a greater advantage in terms of manufacturing cost.

Further, the glass epoxy plate 23 is secured to the right end portion of the rotatable cylinder 14 and the brush 25 is secured to the fixed barrel 1 by means of the brush fixing plate 24, but the locations at which the two are installed may be changed for each other.

FIG. 4 is a schematic block diagram representing the construction of a camera system in which the lens barrel as described above is combined with a camera. The camera system of FIG. 4 is one in which a lens barrel 100 as previously described is combined with a camera body 101. The lens barrel 100 is schematically shown as having photo-taking optical systems L1, L3, a focusing optical system L2, a CPU 110 in the lens, a driving circuit 111, a motor 112 (15 in FIG. 1), an encoder 113, a manually operated ring 114 (13 in FIG. 1), a rotation detecting device 115 (16 and 17 in FIG. 1), a clutch 116 (29 in FIG. 1), a limit circuit 117, a mode changeover switch 118 (20 in FIG. 1), etc.

The camera body 101 is provided with a half mirror 102 constituting a main mirror, a focusing screen 103, a condenser lens 104, a pentagonal prism 105, a finder eyepiece 106, a sub-mirror 107 for reflecting part of light passed through the half mirror 102, a photoelectric converting portion 108 for distance measurement, and a CPU 109 in the camera.

In such a camera system, when the AF mode is selected by means of the extraneously operable mode changeover switch 118, a signal indicative of the AF mode is outputted to the CPU 110 in the lens and also the driving of the motor 112 is controlled by the CPU 110 in the lens through the driving circuit 111, and the AF operation is rendered possible by the driving of the focusing optical system L2.

A beam of light from an object, not shown, passes through the photo-taking lenses L1, L2, L3 to the half mirror 102 in the camera body 101, and a part of the beam of light is reflected thereby and forms an object image on the focusing screen 103. This object image is directed to a photographer's eye through the condenser lens 104, the pentagonal prism 105 and the finder eyepiece 106. Also, part of light passed through the half mirror 102 is reflected by the submirror 107 and is directed to the photoelectric converting portion 108 for distance measurement. A signal from this photoelectric converting portion 108 is inputted to the CPU 109 in the camera which includes a well-known focus control circuit, and the direction and amount of driving of the focusing optical system L2 are determined by the CPU 109 in the camera. A driving signal corresponding to the direction and amount of driving determined in this manner is transmitted from the CPU 109 in the camera to the CPU 110 in the lens, which thus drives the motor 112 through the motor driving circuit 111 and effects drive control until the aforementioned amount of driving is reached. The detection of the amount of driving is effected by the encoder 113. At a point of time when such driving has ended, or during the driving, the in-focus state is detected, and if the lens is not in focus, the above-described operation is repeated until the lens is in focus.

The limit circuit 117 is provided in the rotation limiting portion for the cam cylinder in FIG. 1, and transmits a signal to the CPU 110 in the lens and stops the driving of the focusing optical system L2 or reverses the direction of driving when the focusing optical system L2 reaches the infinity or closest distance position.

In the manner described above, the driving of the focusing optical system L2 is effected on the basis of distance measurement information, whereby it becomes possible to obtain an in-focus state for a desired object.

When the MF mode is now selected by means of the mode changeover switch 118, a signal indicative of the MF mode is outputted to the CPU 110 in the lens, whereby the CPU 110 in the lens stops the driving of the motor 112 through the motor driving circuit 111. At the same time, the clutch 116 is also operated and as previously described in connection with FIG. 1, the rotation of the manually operated ring 114 becomes capable of being transmitted to the focusing optical system L2. Thereby, it becomes possible for the photographer to rotate the manually operated ring 114 and perform the MF operation while looking into the finder eyepiece 106.

Further, when the MF priority AF mode is selected by means of the mode changeover switch 118, a signal indicative of the MF priority AF mode is outputted to the CPU 110 in the lens and also the driving of the motor 112 is controlled by the CPU 110 in the lens through the driving circuit 111, and as in the case of the aforedescribed AF mode, the driving of the focusing optical system L2 based on distance measurement information becomes possible. When during the AF operation, it is desired to change over the mode to the MF mode because of the impossibility of focusing (as in the case of an awkward object) or in order to focus on an object outside the distance measuring zone, if the manually operated ring 114 is rotated, the rotation detecting device 115 detects the rotation of the manually operated ring 114 and outputs it as a signal to the CPU 110 in the lens. As soon as this signal is inputted to the CPU 110 in the lens, this CPU stops the driving of the motor and also the clutch 116 is operated, and the rotation of the manually operated ring 114 becomes capable of being transmitted to the focusing optical system L2.

In the manner described above, it becomes possible for the photographer to immediately change over the mode from the AF mode to the MF mode simply by rotating the manually operated ring 114 without performing the changeover operation by the mode changeover switch 118.

Also, as regards the return from the MF mode to the AF mode, a signal for returning the mode from the MF mode to the AF mode is outputted from the CPU 110 in the lens immediately after for example, the rotation of the manually operated ring 114 is stopped and the rotation signal is no longer generated, or after the lapse of a predetermined time thereafter, and the signal is transmitted to the CPU 109 in the camera to thereby return the mode to the AF mode.

As described above, according to the present invention, there is no excess load body on the cam cylinder 4 and the weight of the lens barrel is reduced, and the load torque and moment of inertia during AF servo driving are suppressed to the necessary minimum. Accordingly, the high-speed response of AF servo becomes possible and the performance of the foreseen driving of a moving object is improved and servo accuracy is improved, and the deterioration of the focusing performance (the aggravation of the focus) during photographing can be prevented.

Also, the weight of the entire cam cylinder 4 is reduced and therefore, the friction loss created in the fitted portion between the inner peripheral portion 1c of the fixed barrel 1 and the fixed barrel cover 12 for fitting is also mitigated, and the amount of work during AF servo driving decreases, which also leads to the effect that the consumption of the battery becomes small.

Likewise, the surface pressure created in the fitted portion is mitigated and therefore, the durability of the cam cylinder 4 is improved.

What is claimed is:

1. A lens barrel comprising:

a focusing optical system movable in the direction of the optical axis thereof to perform a focusing operation;

a moving member rotatable about the optical axis and moving said focusing optical system in the direction of the optical axis by rotation of said moving member;

an operating mechanism rotatively operable about the optical axis for driving said moving member for the focusing operation;

a biasing member for giving a friction torque to the rotation of said operating mechanism, a driving member secured to said operating mechanism for rotatively driving said moving member;

a connecting device secured to said operating mechanism for setting the connected and non-connected states of said operating mechanism and said moving member; and a detecting device for detecting the rotation of said operation mechanism;

wherein said connecting device is brought into its non-connecting state and said focusing optical system is driven by said driving member through said moving member for making the auto focusing operation possible, and when during the auto focusing operation, the rotation of said operating mechanism is detected by said detecting device, the auto focusing operation is immediately stopped and said operating mechanism and said moving member are connected together by said connecting device, thereby enabling the manual focusing operation of driving said focusing optical system by said operating mechanism through said moving member.

2. A lens barrel according to claim 1, further comprising:

a control device for bringing said connecting device into its non-connecting state to enable the auto focusing operation immediately or after a predetermined time when it is detected by said detecting device that the rotation of said operating mechanism has been stopped.

3. A lens barrel according to claim 1, satisfying the following inequality:

$$X>Y,$$

where X is a friction torque created on said operating mechanism by said biasing member, and Y is a torque required for the driving of said moving member.

4. A lens barrel according to claim 1, wherein said connecting device includes a clutch mechanism for mechanically coupling and non-coupling said operating mechanism and said moving member together.

5. A lens barrel comprising:

a fixed barrel;

a focusing optical system moving in the direction of the optical axis thereof for focusing;

a moving member rotatable about said optical axis to thereby move said focusing optical system in the direction of said optical axis;

an operating mechanism manually rotatable about said optical axis with respect to said fixed barrel;

a connecting device secured to said operating mechanism for setting the connected and non-connected states of said operating mechanism and said moving member;

a driving member secured to said operating mechanism for rotating said moving member;

a biasing member provided between said fixed barrel and said operating mechanism for giving a friction torque to the rotation of said operating mechanism with respect to said fixed barrel, said biasing member permitting said operating mechanism to be manually rotated with respect to said fixed barrel against said friction torque, and inhibiting the rotation of said operating mechanism with respect to said fixed barrel when said driving member rotates said moving member;

a detecting device for detecting the rotation of said operating mechanism;

a mode changeover switch for assuming an auto focusing mode, a manual focusing mode and a manual focusing priority auto focusing mode; and a control device for bringing said connecting device into its non-connecting state for focusing said focusing optical system by said driving member through said moving member when said mode changeover switch assumes the auto focusing mode, and bringing said connecting device into its connecting state for enabling the focusing of said focusing optical system by the manual operation of said operating mechanism when said mode changeover switch assume the manual focusing mode, and bringing said connecting device into its non-connecting state for effecting the auto focusing operation of focusing said focusing optical system by said driving member when said mode changeover switch assumes the manual focusing priority auto focusing mode, and rendering said driving member inoperative and bringing said connecting device into its connecting state for enabling the focusing of said focusing optical system by the manual operation of said operating mechanism when during said auto focusing operation, said detecting device detects the rotation of said operating mechanism.

6. A lens barrel comprising:

a focusing optical system movable in the direction of the optical axis of the lens barrel for performing a focusing operation;

a moving member rotatable about the optical axis for moving said focusing optical system for performing the focusing operation;

an operating mechanism for driving said moving member to perform the focusing operation; and a connecting device for coupling and decoupling said operating mechanism to said moving member, said connecting device decoupling said operating mechanism from said moving member for an autofocusing operation, said connecting device coupling said operating mechanism to said moving member for a manual focusing operation, and said connecting device coupling said operating mechanism to said moving member when during the autofocusing operation said operating mechanism is manually operated.

* * * * *